United States Patent
Choi et al.

(10) Patent No.: US 9,488,759 B2
(45) Date of Patent: Nov. 8, 2016

(54) VARIFOCAL LENS

(71) Applicant: SAMSUNG ELECTRONICS CO., LTD., Suwon-si (KR)

(72) Inventors: Byoung-lyong Choi, Yongin-si (KR); Eun-kyung Lee, Yongin-si (KR); Seung-nam Cha, Yongin-si (KR); Sun-il Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/057,538

(22) Filed: Mar. 1, 2016

(65) Prior Publication Data

US 2016/0178811 A1 Jun. 23, 2016

Related U.S. Application Data

(62) Division of application No. 13/719,339, filed on Dec. 19, 2012, now abandoned.

(30) Foreign Application Priority Data

Feb. 7, 2012 (KR) .................. 10-2012-0012536

(51) Int. Cl.
*G02F 1/29* (2006.01)
*G02B 3/14* (2006.01)
*B82Y 15/00* (2011.01)

(52) U.S. Cl.
CPC ............... *G02B 3/14* (2013.01); *B82Y 15/00* (2013.01); *Y10S 977/742* (2013.01); *Y10S 977/762* (2013.01)

(58) Field of Classification Search
CPC ..................... G02F 1/29; G02B 3/14
See application file for complete search history.

(56) References Cited

U.S. PATENT DOCUMENTS

| 7,420,327 B2 | 9/2008 | Fujitani | |
|---|---|---|---|
| 7,475,985 B2 | 1/2009 | Blum et al. | |
| 7,649,665 B2 * | 1/2010 | Kempa | B82Y 20/00 136/244 |
| 7,852,454 B2 | 12/2010 | Border et al. | |
| 8,889,455 B2 * | 11/2014 | Duane | H01L 21/02381 438/57 |
| 8,926,933 B2 * | 1/2015 | Zhang | B82Y 10/00 423/447.1 |
| 8,951,631 B2 * | 2/2015 | Shah | B22F 3/002 428/368 |
| 8,951,632 B2 * | 2/2015 | Shah | D02G 3/16 428/368 |

(Continued)

FOREIGN PATENT DOCUMENTS

| KR | 10-2007-0057163 A | 6/2007 |
|---|---|---|
| KR | 10-2009-0058772 A | 6/2009 |

(Continued)

OTHER PUBLICATIONS

A. F. Naumov et al.; "Control Optimization of Spherical Modal Liquid Crystal Lenses"; Optics Express; vol. 4; No. 9; Apr. 26, 1999; pp. 344-352.

(Continued)

*Primary Examiner* — Timothy L Rude
(74) *Attorney, Agent, or Firm* — Sughrue Mion, PLLC (57) ABSTRACT

A varifocal lens including a first liquid crystal layer; a first electrode portion disposed below the first liquid crystal layer and having a flat shape; a first non-uniform electric field generator which generates a non-uniform electric field in the first liquid crystal layer together with the first electrode portion, and the first non-uniform electric field generator including a second electrode portion having a flat shape.

12 Claims, 8 Drawing Sheets

(56) References Cited

U.S. PATENT DOCUMENTS

| | | | |
|---|---|---|---|
| 9,012,887 B2* | 4/2015 | Samuelson | B81C 1/00111 257/13 |
| 9,017,808 B2* | 4/2015 | Wang | H01L 23/373 252/71 |
| 9,036,102 B2* | 5/2015 | Galstian | G02F 1/134309 349/200 |
| 9,134,568 B2* | 9/2015 | Cho | G02F 1/133526 |
| 2009/0016801 A1 | 1/2009 | Liu | |
| 2010/0208152 A1* | 8/2010 | Kim | G02B 3/14 349/15 |
| 2011/0109824 A1 | 5/2011 | Galstian | |
| 2011/0216257 A1 | 9/2011 | Galstian et al. | |
| 2012/0120335 A1 | 5/2012 | Galstian et al. | |
| 2013/0077001 A1 | 3/2013 | Galstian et al. | |

FOREIGN PATENT DOCUMENTS

| | | |
|---|---|---|
| KR | 10-2010-0061820 A | 6/2010 |
| KR | 10-2011-0078791 A | 7/2011 |

OTHER PUBLICATIONS

Hongwen Ren et al.; "Adaptive Liquid Crystal Lens with Large Focal Length Tunability"; Optics Express; vol. 14; No. 23; Nov. 13, 2006; pp. 11292-11298.

Bin Wang et al.; "Liquid Crystal Lens With Focal Length Variable From Negative to Positive Values"; IEEE Photonics Technology Letters; vol. 18; No. 1; Jan. 1, 2006; pp. 79-81.

Yung-Yuan Kao et al.; "A New Low-Voltage-Driven GRIN Liquid Crystal Lens with Multiple Ring Electrodes in Unequal Widths"; Optics Express; vol. 18; No. 18; Aug. 30, 2010; pp. 18506-18518.

* cited by examiner

VARIFOCAL LENS

CROSS-REFERENCE TO RELATED APPLICATIONS

This application is a divisional application of U.S. patent application Ser. No. 13/719,339, filed on Dec. 19, 2012, which claims priority from Korean Patent Application No. 10-2012-0012536, filed on Feb. 7, 2012, in the Korean Intellectual Property Office, the disclosures of which are incorporated herein in their entirety by reference.

BACKGROUND

1. Field

The present disclosure relates to varifocal lenses.

2. Description of the Related Art

A lens is an instrument for concentrating or distributing light according to properties whereby light is refracted at a boundary surface between different media with different refractive indexes and is a basic component of various imaging devices such as cameras.

A focal length of a lens is determined according to a curvature of a lens surface and a material of a lens. Recently, demand for a lens system having a varifocal function for obtaining better images has increased. A varifocal function is used for an autofocusing operation or a zooming operation and is performed by mechanically moving some lenses constituting a lens system by using a motor or the like or by changing a curvature of a lens surface by using a liquid lens.

Recently, there has been increased interest in techniques for using a liquid crystal as an optical lens by electrically controlling the operation thereof. Liquid crystal molecules are aligned along the direction of an electric field. Since the refractive index in a major axis direction is generally different from the refractive index in a minor axis direction in the case of liquid crystal molecules, the liquid crystal molecules have various refractive indexes according to their alignment states. In particular, if a boundary surface, where the refractive index changes due to the alignment of liquid crystal molecules, is curved, the liquid crystal molecules refract light transmitted thereto, thereby acting as an optical lens.

SUMMARY

Additional aspects will be set forth in part in the description which follows and, in part, will be apparent from the description, or may be learned by practice of the exemplary embodiments.

According to an aspect of an exemplary embodiment, a varifocal lens includes a first liquid crystal layer; a first electrode portion disposed below the first liquid crystal layer and having a flat shape; a first non-uniform electric field generation unit (e.g. electric field generator) for generating a non-uniform electric field in the first liquid crystal layer together with the first electrode portion, and comprising a second electrode portion having a flat shape.

The first non-uniform electric field generation unit may further include a first resistance layer disposed between the second electrode portion and the first liquid crystal layer.

The first resistance layer may be formed of a semiconductor, an insulator, or a conductive polymer.

The first resistance layer may be configured to have an inhomogeneous resistivity. In this case, the first electrode portion may be shaped so as to face an entire lower surface of the first liquid crystal layer, and the second electrode portion may be shaped so as to face the entire upper surface of the first liquid crystal layer. In addition, at least one of the first electrode portion and the second electrode portion may have a structure in which a plurality of electrodes are spaced apart from each other and are arranged to have an overall flat structure. For example, at least one of the first electrode portion and the second electrode portion may have a structure in which a plurality of electrodes each having a fan shape are spaced apart from each other to form a circular shape.

The first resistance layer may be formed of a semiconductor or an insulator including a plurality of impurities that are conductive carriers, and the impurities may be irregularly distributed in the semiconductor or the insulator.

The first resistance layer may have a structure in which a plurality of material layers with different resistivity are perpendicularly stacked or horizontally arranged on an upper surface of the first liquid crystal layer.

The first electrode portion may be shaped so as to face an entire lower surface of the first liquid crystal layer, and the second electrode portion may be shaped such that an opening is formed in a central portion of the second electrode portion and the second electrode portion faces an edge portion of an upper surface of the first liquid crystal layer.

At least one of the first electrode portion and the second electrode portion may have a structure in which a plurality of electrodes are spaced apart from each other and are arranged to have an overall flat structure. For example, the first electrode portion may have a structure in which a plurality of electrodes each having a fan shape are spaced apart from each other to form a circular shape. The second electrode portion may have a structure in which a plurality of electrodes that are each shaped like a fan of which an apex portion is cut and are spaced apart from each other to form a ring shape.

The first non-uniform electric field generation unit may further include a third electrode portion that is spaced apart from the second electrode portion and has a different flat shape from that of the second electrode portion.

The first non-uniform electric field generation unit may further include a first nanostructure layer disposed between the second electrode portion and the first liquid crystal layer and comprising a plurality of nano structures.

Each of the plurality of nano structures may include any one of carbon nanotube (CNT), gold nanowire, ZnO nanowire, and Si nanowire.

The plurality of nano structures has a non-uniform or uniform length distribution.

The varifocal lens may further include a second liquid crystal layer disposed below the first electrode portion; and a second non-uniform electric field generation unit for generating a non-uniform electric field in the second liquid crystal layer together with the first electrode portion, and comprising a third electrode portion having a flat shape.

The second non-uniform electric field generation unit may further include a second resistance layer disposed between the second liquid crystal layer and the third electrode portion.

The second non-uniform electric field generation unit may further include a second nanostructure layer disposed between the second liquid crystal layer and the third electrode and comprising a plurality of nano structures.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to exemplary embodiments, examples of which are illustrated in the accompanying drawings, wherein like reference numerals refer to like elements throughout. In the drawings, the sizes of elements are exaggerated for clarity and convenience of understanding. Also, the exemplary embodiments may have different forms and should not be construed as being limited to the descriptions set forth herein. Accordingly, the exemplary embodiments are merely described below, by referring to the figures, to explain aspects of the present description. Expressions such as "at least one of," when preceding a list of elements, modify the entire list of elements and do not modify the individual elements of the list.

Figure 1:
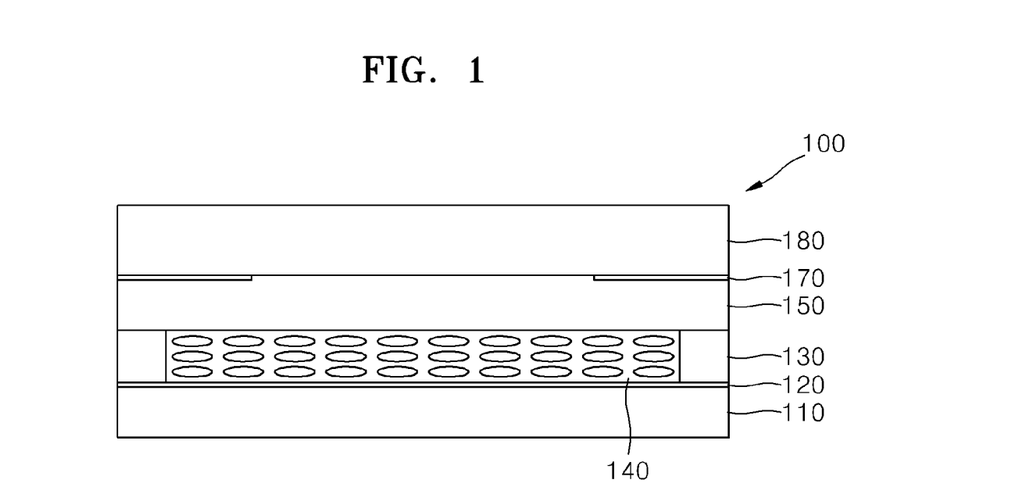
FIG. 1 is a cross-sectional view of a varifocal lens according to an exemplary embodiment.
Figure 2:
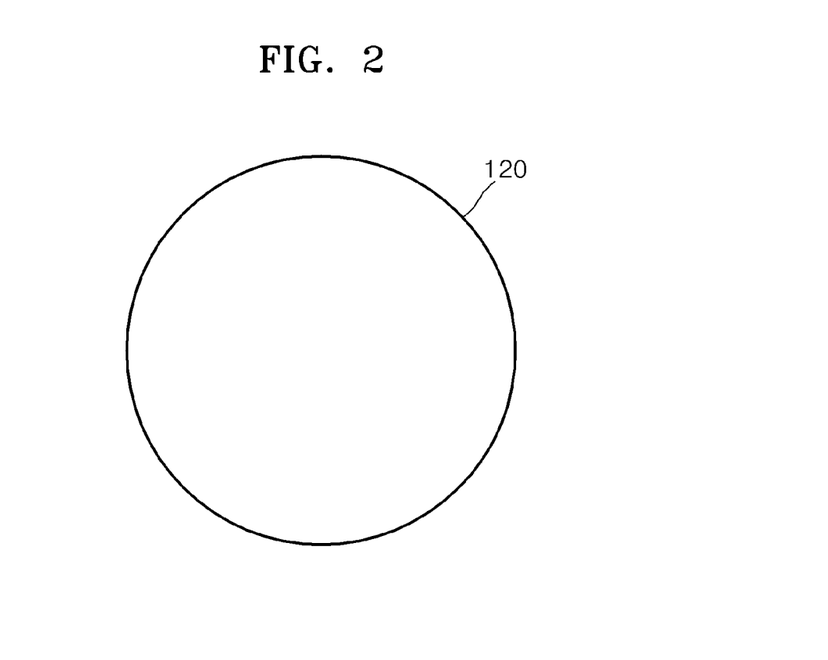
FIG. 2 is a plan view for explaining an exemplary shape of a first electrode portion included in the varifocal lens of FIG. 1, according to an aspect exemplary embodiment.
Figure 3:
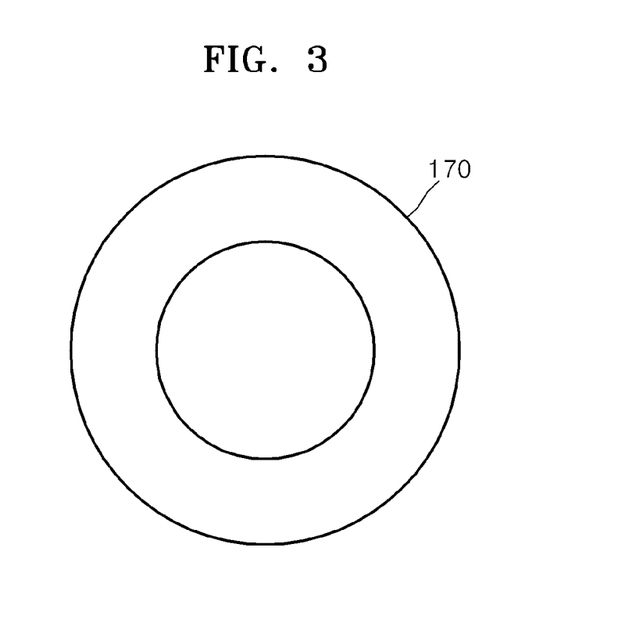
FIG. 3 is a plan view for explaining an exemplary shape of a second electrode portion included in the varifocal lens of FIG. 1, according to an aspect of an exemplary embodiment.
Figure 4:
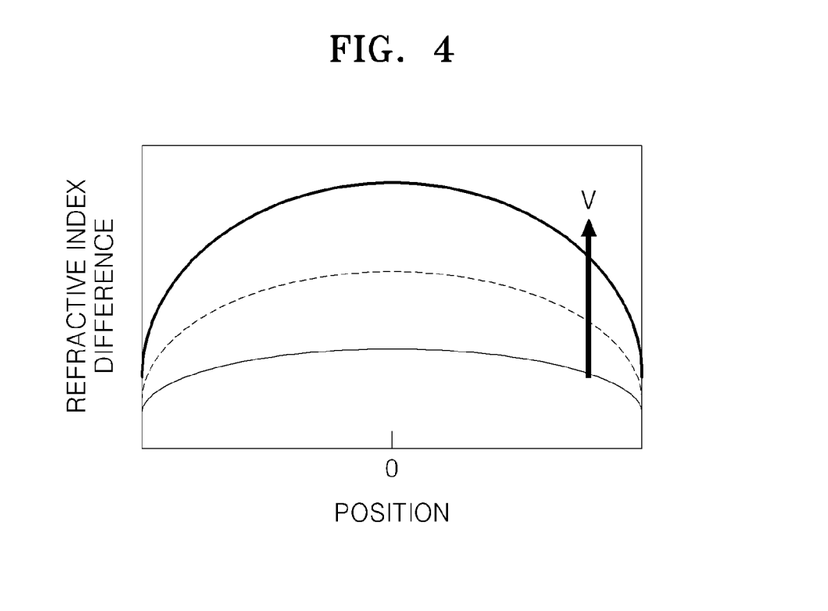
FIG. 4 is a conceptual diagram for explaining a difference between refractive indexes, which are generated in a first liquid crystal layer of the varifocal lens of FIG. 1 according to a voltage between a first electrode portion and a second electrode portion in the varifocal lens of FIG. 1, according to an aspect of an exemplary embodiment.

FIG. 1 is a cross-sectional view of a varifocal lens 100 according to an exemplary embodiment. FIG. 2 is a plan view for explaining an exemplary shape of a first electrode portion 120 included in the varifocal lens 100 of FIG. 1, according to an exemplary embodiment. FIG. 3 is a plan view for explaining an exemplary shape of a second electrode portion 170 included in the varifocal lens 100 of FIG. 1, according to an exemplary embodiment. FIG. 4 is a conceptual diagram for explaining a difference between refractive indexes, which are generated in a first liquid crystal layer 140 of the varifocal lens 100 of FIG. 1 according to a voltage between the first electrode portion 120 and the second electrode portion 170 in the varifocal lens 100 of FIG. 1, according to an exemplary embodiment.

The varifocal lens 100 includes the first liquid crystal layer 140, the first electrode portion 120 disposed below the first liquid crystal layer 140 and having a flat shape, and a non-uniform electric field generation unit for generating a non-uniform electric field in the first liquid crystal layer 140 together with the first electrode portion 120, and including the second electrode portion 170 having a flat shape.

The first liquid crystal layer 140 includes a plurality of liquid crystal molecules. When an electric field is generated in the first liquid crystal layer 140, the liquid crystal molecules are aligned according to a direction of the electric field. In this case, the liquid crystal molecules have different refractive indexes of, for example, about 1.53 to about 1.79 according to directions in which the liquid crystal molecules are aligned. If the liquid crystal molecules are aligned in the same direction, a boundary surface at which a refractive index is changed is not formed in the first liquid crystal layer 140. In addition, in order to constitute such a boundary surface, a non-uniform electric field needs to be generated such that liquid crystal molecules are aligned in different directions according to their positions in the first liquid crystal layer 140. To this end, the varifocal lens 100 includes a non-uniform electric field generation unit.

A structure of the varifocal lens 100 will be described in detail with reference to FIGS. 1 through 3.

The first electrode portion 120 having a flat shape is disposed on a first substrate 110 and the first liquid crystal layer 140 is disposed on the first electrode portion 120. The first liquid crystal layer 140 is encapsulated by a first spacer 130. A second substrate 180 is disposed above the first liquid crystal layer 140, wherein the second electrode portion 170 facing the first liquid crystal layer 140 is disposed on a lower surface of the second substrate 180. In addition, a first resistance layer 150 may be further disposed between the second electrode portion 170 and the first liquid crystal layer 140.

The first substrate 110 and the second substrate 180 may be formed of a transparent material, for example, glass or a transparent plastic material.

In order to generate a non-uniform electric field in the first liquid crystal layer 140, the first electrode portion 120 and the second electrode portion 170 may have different shapes. For example, the first electrode portion 120 may be shaped so as to face an entire lower surface of the first liquid crystal layer 140 and the second electrode portion 170 may be shaped such that an opening is formed in a central portion of the second electrode portion 170 and the second electrode portion 170 faces an edge portion of an upper surface of the first liquid crystal layer 140. As shown in FIGS. 2 and 3, the first electrode portion 120 and the second electrode portion 170 may have a circular shape and a ring shape, respectively but the present embodiment is not limited thereto.

The first electrode portion 120 and the second electrode portion 170 may be formed of a transparent electrode material.

The first resistance layer 150 may be formed of a semiconductor, an insulator, or a conductive polymer and may be configured so as to have a homogeneous resistivity or an inhomogeneous resistivity.

In order to have the inhomogeneous resistivity, the first resistance layer 150 may be formed of a semiconductor or an insulator including a plurality of impurities such as conductive carriers and the impurities may be irregularly distributed in the semiconductor or the insulator. Alternatively, in order to have the inhomogeneous resistivity, the first resistance layer 150 may include a plurality of material layers with different resistivity and may have, for example, a structure in which the material layers are perpendicularly stacked or horizontally arranged on an upper surface of the first liquid crystal layer 140.

A shape of the second electrode portion 170 or a material of the first resistance layer 150 may be determined in consideration of a shape of a surface of a lens to be formed in the first liquid crystal layer 140. As shown in FIG. 4, when a voltage is applied between the first electrode portion 120 and the second electrode portion 170, a difference in refractive indexes may be generated in the first liquid crystal layer 140 and varies according to an electric field at positions in the first liquid crystal layer 140. A boundary surface at which a difference in refractive indexes occurs may constitute a lens surface. A shape of a graph shown in FIG. 4 is changed according to a voltage V applied between the first electrode portion 120 and the second electrode portion 170. A pattern of the graph shown in FIG. 4 may be minutely adjusted according to the shape of the second electrode portion 170, for example, the size of the opening or the distribution of the resistivity of the first resistance layer 150 may be adjusted.

Thus far, a case where each of the first electrode portion 120 and the second electrode portion 170 includes a single electrode has been described. However, the present embodiment is not limited thereto. For example, at least one of the first electrode portion 120 and the second electrode portion 170 may have a structure in which a plurality of electrodes are spaced apart from each other and are arranged to have an overall flat structure.

Figure 5:
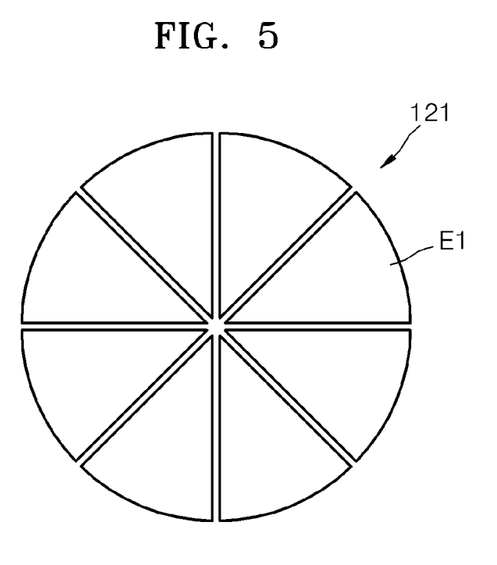
FIG. 5 is a plan view of a first electrode portion included in the varifocal lens of FIG. 1, according to another aspect of an exemplary embodiment.
Figure 6:
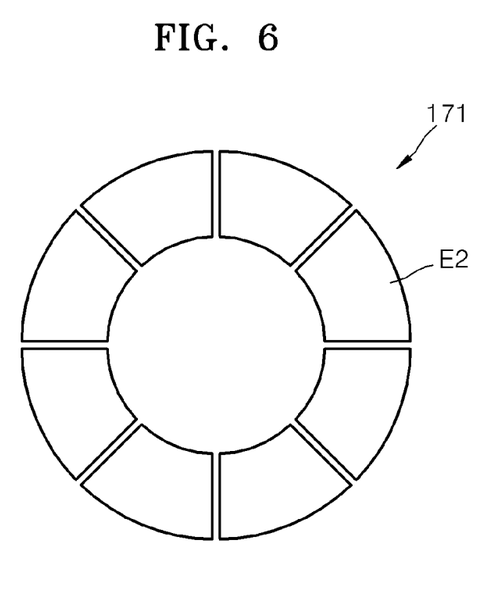
FIG. 6 is a plan view of a second electrode portion included in the varifocal lens of FIG. 1, according to another aspect of an exemplary embodiment.

FIG. 5 is a plan view of a first electrode portion 121 included in the varifocal lens 100 of FIG. 1, according to another aspect of an exemplary embodiment. FIG. 6 is a plan view of a second electrode portion 171 included in the varifocal lens 100 of FIG. 1, according to another aspect of an exemplary embodiment.

The first electrode portion 121 may have a structure in which a plurality of electrodes E1, each having a fan shape or triangular shape, are spaced apart from each other to form a circular shape. In addition, the second electrode portion 171 may have a structure in which a plurality of electrodes E2 are each shaped like a fan or triangle of which an apex portion is cut and are spaced apart from each other to form a ring shape.

The structures of the first electrode portion 121 and the second electrode portion 171 are used to control refractive indexes differently according to regions obtained by dividing the first liquid crystal layer 140 and may be used in, for example, a lens for treating astigmatism.

The shapes of the first electrode portion 121 and the second electrode portion 171 shown in FIGS. 5 and 6 and the shapes of the first electrode portion 120 and the second electrode portion 170 shown in FIGS. 2 and 3 may be combined in various ways and may be applied to the varifocal lens 100 of FIG. 1. For example, the first electrode portion 120 having a flat circular shape and the second electrode portion 171 including a plurality of electrodes that are each shaped like a fan of which an apex portion is cut may be used together. The first electrode portion 121 including a plurality of electrodes each having a fan shape and the second electrode portion 170 having a ring shape may be used together, or alternatively, the first electrode portion 121 including a plurality of electrodes each having a fan shape and the second electrode portion 171 including a plurality of electrodes that are each shaped like a fan of which an apex portion is cut may be used together.

Figure 7:
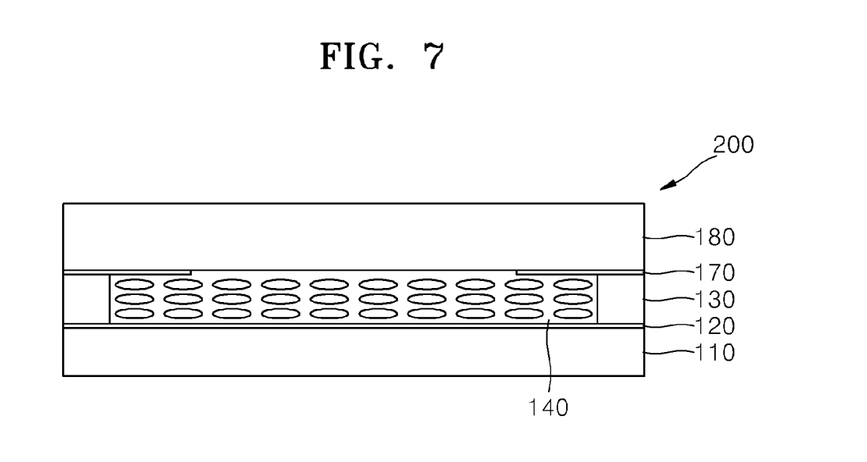
FIG. 7 is a cross-sectional view of a varifocal lens according to another exemplary embodiment.

FIG. 7 is a cross-sectional view of a varifocal lens 200 according to another exemplary embodiment.

The varifocal lens 200 is different from the varifocal lens 100 of FIG. 1 in that the varifocal lens 200 does not include a resistance layer. That is, a non-uniform electric field may be generated in the first liquid crystal layer 140 by the first electrode portion 120 and the second electrode portion 170 that have different shapes. When a range in which a lens surface formed by controlling an applied voltage is appropriate, a resistance layer used in FIG. 1 may be omitted.

Figure 8:
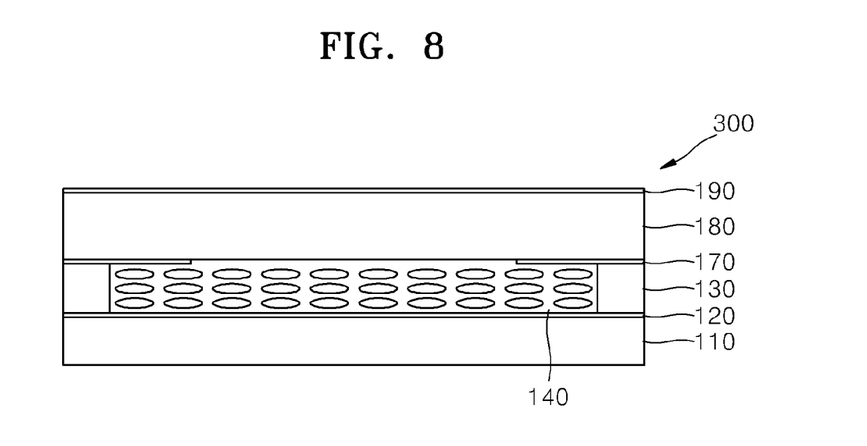
FIG. 8 is a cross-sectional view of a varifocal lens according to another exemplary embodiment.

FIG. 8 is a cross-sectional view of a varifocal lens 300 according to another exemplary embodiment.

The varifocal lens 300 is different from the varifocal lens 200 of FIG. 7 in that the varifocal lens 300 further includes a third electrode portion 190. That is, the varifocal lens 300 further includes the third electrode portion 190 that is spaced apart from the second electrode portion 170 and has a different flat shape from the second electrode portion 170. The third electrode portion 190 is formed to minutely adjust the non-uniform electric field distribution generated in the first liquid crystal layer 140 and is shaped so as to face an entire portion of the first liquid crystal layer 140, as shown in FIG. 8. However, this is just an example. For example, an opening may be formed in the third electrode portion 190.

Figure 9:
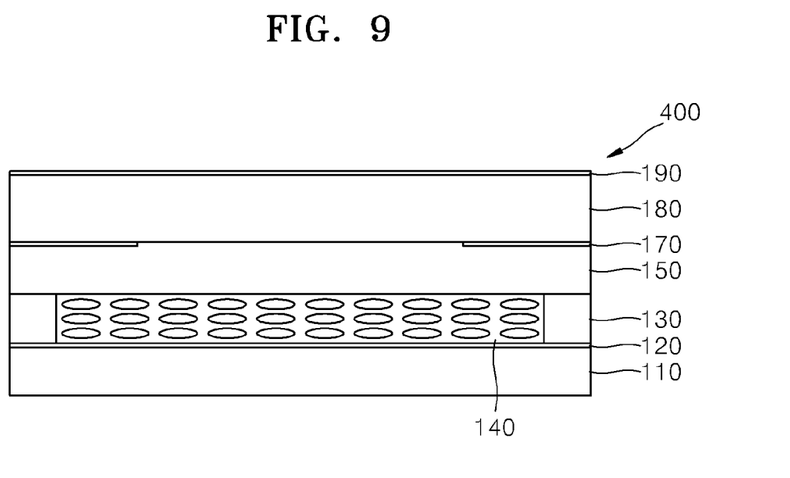
FIG. 9 is a cross-sectional view of a varifocal lens according to another exemplary embodiment.

FIG. 9 is a cross-sectional view of a varifocal lens 400 according to another exemplary embodiment.

The varifocal lens 400 is obtained by adding the third electrode portion 190 of FIG. 8 to the varifocal lens 100 of FIG. 1.

Electrode portions of the varifocal lenses 200, 300, and 400 of FIGS. 7 through 9 may be modified as described with reference to FIG. 1. That is, at least one of the first electrode portion 120 and the second electrode portion 170 may have an overall flat structure in which a plurality of electrodes are spaced apart from each other. In addition, the shapes of the first electrode portions 120 and 121 and the second electrode portions 170 and 171 shown in FIGS. 2, 3, 5, and 6 may be combined in various ways.

Figure 10:
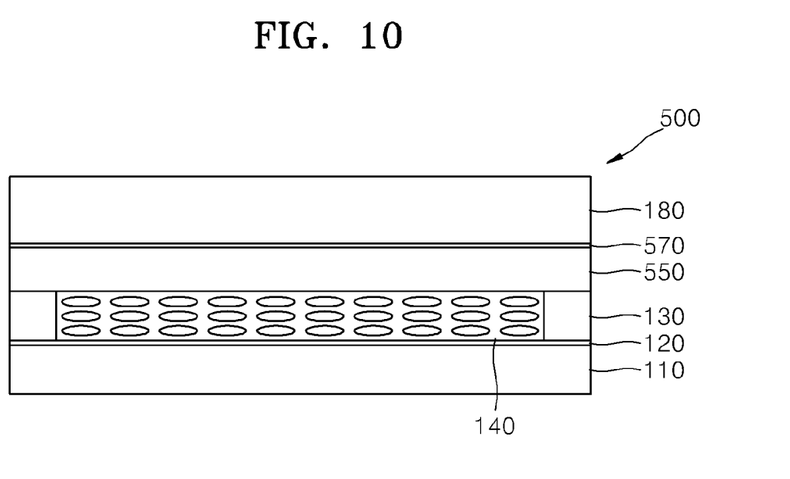
FIG. 10 is a cross-sectional view of a varifocal lens according to another exemplary embodiment.

FIG. 10 is a cross-sectional view of a varifocal lens 500 according to another exemplary embodiment.

The varifocal lens 500 is different from the varifocal lens 100 of FIG. 1 in that the varifocal lens 500 includes a second electrode portion 570 having the same shape as the first electrode portion 120 and a first resistance layer 550 having an inhomogeneous resistivity. In general, when a voltage is applied between two flat type electrodes, since an almost homogeneous electric field is generated between the electrodes, the first resistance layer 550 having an inhomogeneous resistivity may be used to generate a non-uniform electric field in the first liquid crystal layer 140.

The first resistance layer 550 may be formed of a semiconductor or an insulator including a plurality of impurities such as conductive carriers and the impurities may be irregularly distributed in the semiconductor or the insulator. Alternatively, the first resistance layer 550 may have a structure in which a plurality of material layers are perpendicularly stacked or horizontally arranged on an upper surface of the first liquid crystal layer 140.

Figure 11:
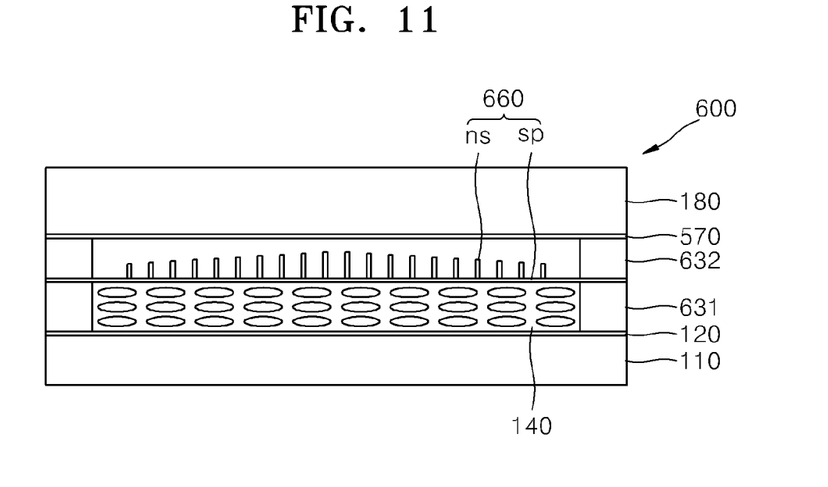
FIG. 11 is a cross-sectional view of a varifocal lens according to another exemplary embodiment

FIG. 11 is a cross-sectional view of a varifocal lens 600 according to another exemplary embodiment.

The varifocal lens 600 is different from the varifocal lens 500 of FIG. 10 in that the varifocal lens 600 includes a first nano structure layer 660 including a plurality of nano structures 'ns', instead of the first resistance layer 550. That is, the first liquid crystal layer 140 is disposed between the first electrode portion 120 and the second electrode portion 570 each having a flat shape. In addition, the first nano structure layer 660 may be disposed between the first liquid crystal layer 140 and the second electrode portion 570. The varifocal lens 600 may further include a first spacer 631 for encapsulating the first liquid crystal layer 140 and a second spacer 632 for encapsulating a space in which the first nano structure layer 660 is disposed.

The first nano structure layer 660 may include a plurality of nano structures 'ns' that are fixed on a support membrane 'sp'. The nano structures 'ns' may each include, for example, any one of carbon nanotube (CNT), gold nanowire, ZnO nanowire, and Si nanowire. The first nano structure layer 660 is formed to generate a non-uniform electric field in the first liquid crystal layer 140 using a property that a nano structure maximizes a field effect. The nanostructures 'ns' have a non-uniform length distribution that is not limited to the case shown in FIG. 11.

In the varifocal lenses 500 and 600 of FIGS. 10 and 11, each of the first electrode portion 120 and the second electrode portion 570 includes a single electrode. However, the exemplary embodiment is not limited thereto. At least one of the first electrode portion 120 and the second electrode portion 570 may have an overall flat structure in which a plurality of electrodes are spaced apart from each other. For example, at least one of the first electrode portion 120 and the second electrode portion 570 may have a structure in which a plurality of electrodes each having a fan shape are spaced apart from each other to have a circular shape, as shown in FIG. 5.

Figure 12:
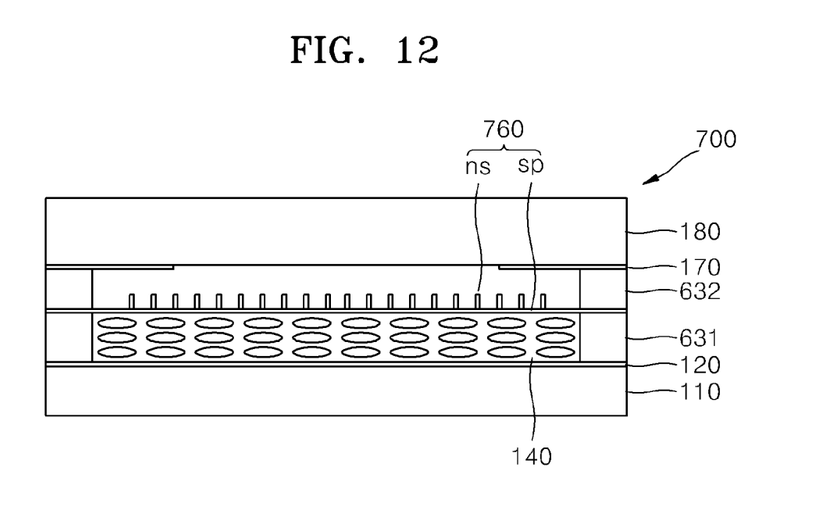
FIG. 12 is a cross-sectional view of a varifocal lens according to another exemplary embodiment.

FIG. 12 is a cross-sectional view of a varifocal lens 700 according to another exemplary embodiment.

The varifocal lens 700 is different from the varifocal lens 600 of FIG. 11 in terms of the shapes of the second electrode portion 170 and a first nano structure layer 760. That is, the second electrode portion 170 has an opening and may have, for example, a ring shape as shown in FIG. 3. A plurality of nano structures 'ns' of the first nano structure layer 760 may have a uniform length distribution.

Varifocal lenses 800, 900, 1000, and 1010 of FIGS. 13 through 16 are different from the above-described exemplary embodiments in that each of the varifocal lenses 800, 900, 1000, and 1010 further includes a second liquid crystal layer 840 and a second non-uniform electric field generation unit including third electrode portions 870, 970, 670, and 770 that each have a flat shape and form a non-uniform electric field in the second liquid crystal layer 840. The second non-uniform electric field formation unit includes a resistance layer or a nanostructure, like the first non-uniform electric field generation unit.

Hereinafter, structures of the varifocal lenses 800, 900, 1000, and 1010 will be described in detail with reference to FIGS. 13 through 16.

Figure 13:
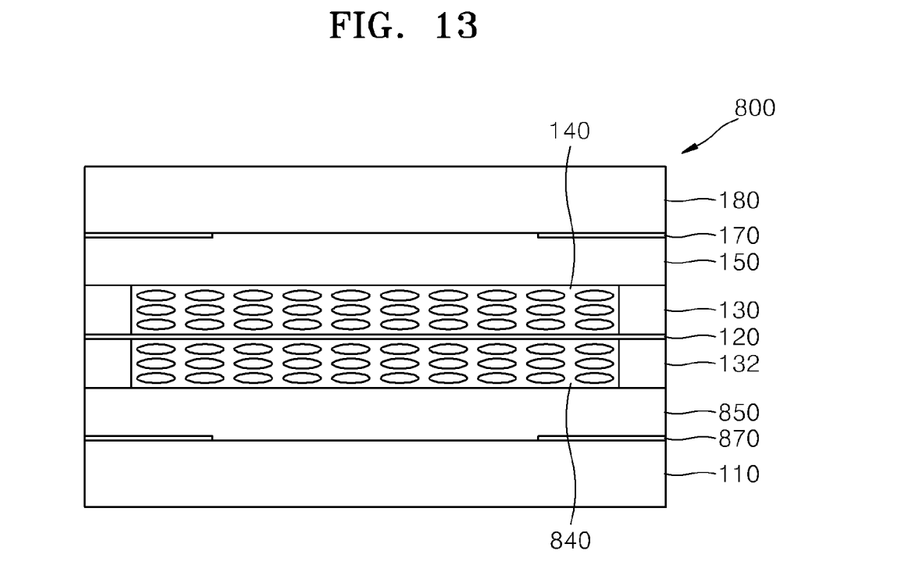
FIG. 13 is a cross-sectional view of a varifocal lens according to another exemplary embodiment.

The varifocal lens 800 of FIG. 13 has a structure obtained by symmetrically arranging two varifocal lenses that each are substantially the same as the varifocal lens 100 of FIG. 1.

That is, the varifocal lens 800 further includes the second liquid crystal layer 840 and further includes a second resistance layer 850 and a third electrode portion 870 in order to generate a non-uniform electric field in the second liquid crystal layer 840. In addition, the varifocal lens 800 may further include a second spacer 132 for encapsulating the second liquid crystal layer 840. The first electrode portion 120 may function as a common electrode for generating an electric field in the first liquid crystal layer 140 and the second liquid crystal layer 840. Each of the second electrode portion 170 and the third electrode portion 870 may generate a non-uniform electric field in the first liquid crystal layer 140 and the second liquid crystal layer 840 since the second electrode portion 170 and the third electrode portion 870 each have different shapes from the first electrode portion 120. Thus, the first resistance layer 150 and the second resistance layer 850 may have a homogeneous or inhomogeneous resistivity distribution.

Figure 14:
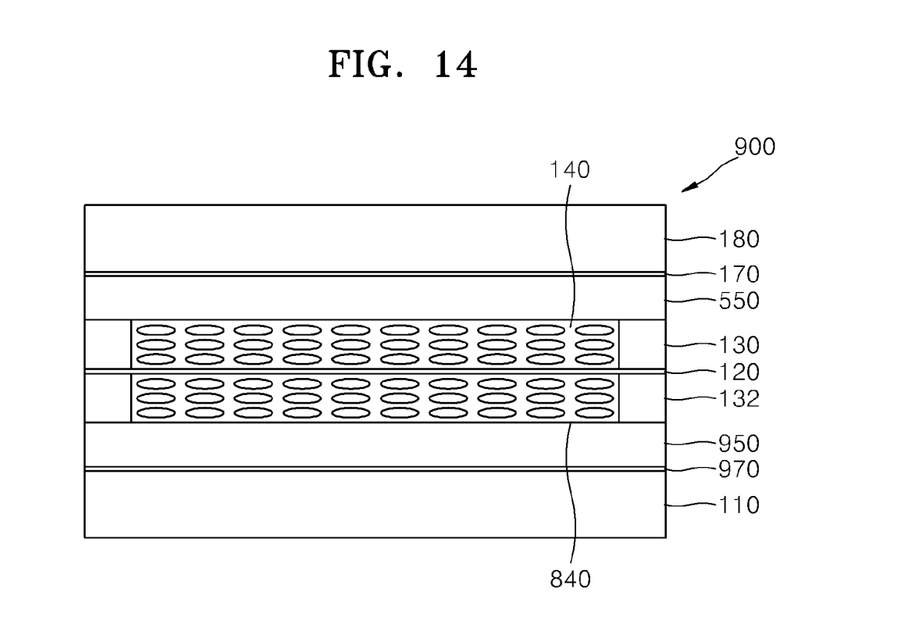
FIG. 14 is a cross-sectional view of a varifocal lens according to another exemplary embodiment.

The varifocal lens 900 of FIG. 14 has a structure obtained by symmetrically arranging two varifocal lenses that each are substantially the same as the varifocal lens 500 of FIG. 10.

That is, the varifocal lens 900 further include the second liquid crystal layer 840 and further includes a second resistance layer 950 and the third electrode portion 970 in order to form a non-uniform electric field in the second liquid crystal layer 840. In addition, the varifocal lens 900 may further include the second spacer 132 for encapsulating the second liquid crystal layer 840. The first electrode portion 120 may function as a common electrode for forming an electric field in the first liquid crystal layer 140 and the second liquid crystal layer 840. Each of the second electrode portion 570 and the third electrode portion 970 has the same shape as the first electrode portion 120. Thus, in order to form a non-uniform electric field in the first liquid crystal layer 140 and the second liquid crystal layer 840, the first resistance layer 550 and the second resistance layer 950 may have an inhomogeneous resistivity distribution.

Figure 15:
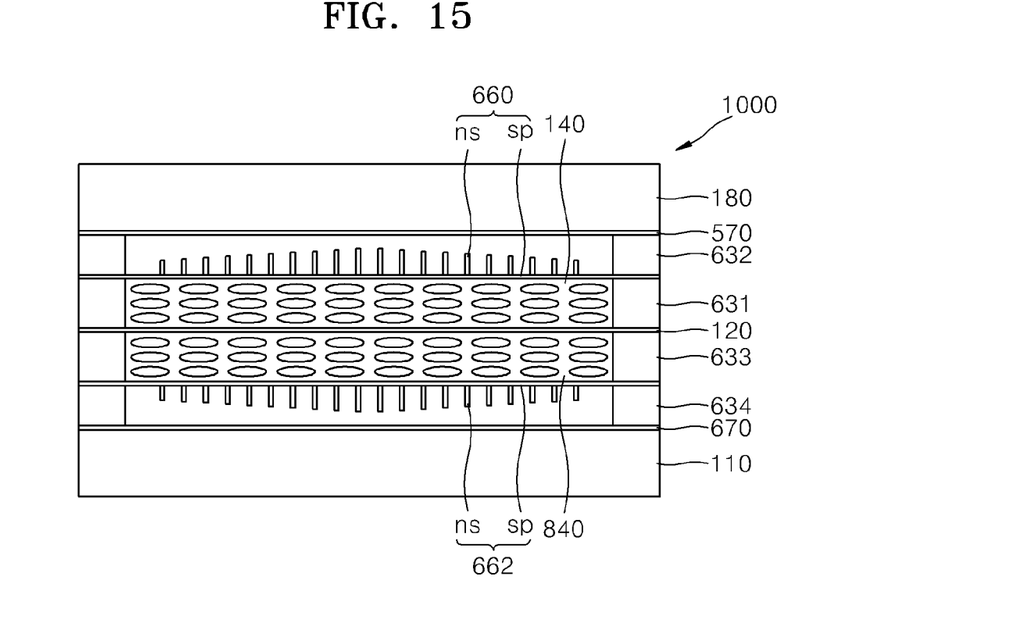
FIG. 15 is a cross-sectional view of a varifocal lens according to another exemplary embodiment.

The varifocal lens 1000 of FIG. 15 has a structure obtained by symmetrically arranging two varifocal lenses that each are substantially the same as the varifocal lens 600 of FIG. 11.

That is, the varifocal lens 1000 further includes the second liquid crystal layer 840 and further includes a third electrode portion 670 and a second nanostructure layer 662 including a plurality of nanostructures 'ns' in order to generate a non-uniform electric field in the second liquid crystal layer 840. In addition, the varifocal lens 1000 may further include a third spacer 633 for encapsulating the second liquid crystal layer 840 and a fourth spacer 634 for encapsulating a space in which the second nanostructure layer 662 is disposed.

The first electrode portion 120 may function as a common electrode for generating an electric field in the first liquid crystal layer 140 and the second liquid crystal layer 840. Each of the second electrode portion 570 and the third electrode portion 670 has the same shape as the first electrode portion 120. Thus, in order to generate a non-uniform electric field in the first liquid crystal layer 140 and the second liquid crystal layer 840, the first nano structure layer 660 and the nanostructures 'ns' of the second nanostructure layer 662 may have a non-uniform length distribution.

Figure 16:
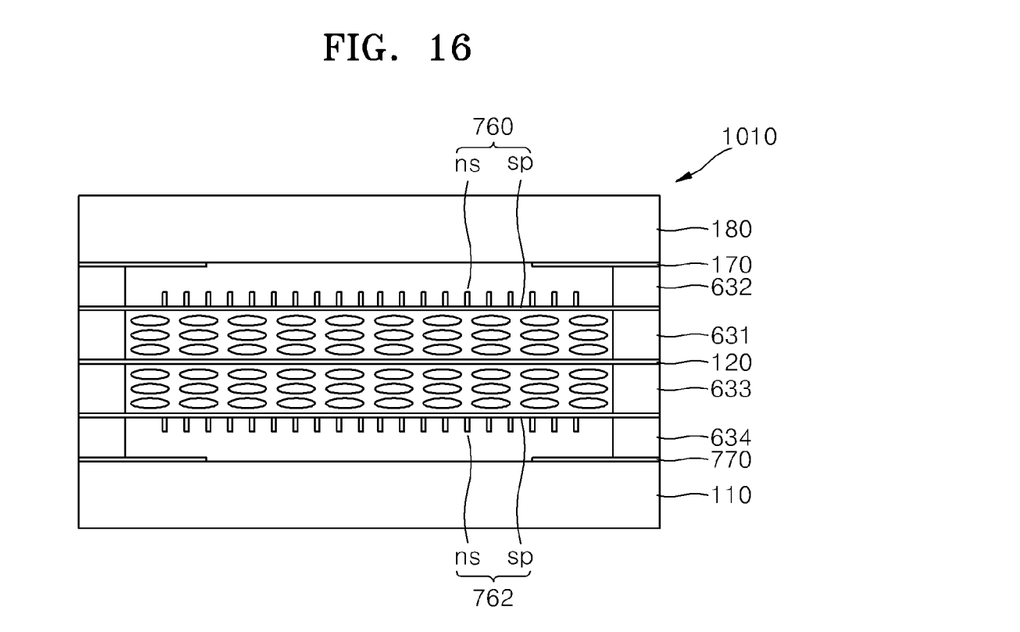
FIG. 16 is a cross-sectional view of a varifocal lens according to another exemplary embodiment.

The varifocal lens 1010 of FIG. 16 has a structure obtained by symmetrically arranging two varifocal lenses that each are substantially the same as the varifocal lens 700 of FIG. 12.

That is, the varifocal lens 1000 further includes the second liquid crystal layer 840 and further includes a third electrode portion 770 and a second nanostructure layer 762 including a plurality of nanostructures 'ns' in order to generate a non-uniform electric field in the second liquid crystal layer 840. In addition, the varifocal lens 1000 may further include the third spacer 633 for encapsulating the second liquid crystal layer 840 and the fourth spacer 634 for encapsulating a space formed by the second nanostructure layer 662.

The first electrode portion 120 may function as a common electrode for generating an electric field in the first liquid crystal layer 140 and the second liquid crystal layer 840.

Each of the second electrode portion 170 and the third electrode portion 770 has a different shape from the first electrode portion 120. Due to the shapes of the second electrode portion 170 and the third electrode portion 770, a non-uniform electric field may be generated in the first liquid crystal layer 140 and the second liquid crystal layer 840. Thus, the first nano structure layer 760 and the nanostructures 'ns' of the second nanostructure layer 762 may have a uniform length distribution.

Each of the varifocal lenses 800, 900, 1000, and 1010 described with reference to FIGS. 13 through 16 forms two different lens surfaces by driving the first liquid crystal layer 140 and the second liquid crystal layer 840 separately. Thus, each of the varifocal lenses 800, 900, 1000, and 1010 may be designed to have various focal length by combining the two lens surfaces.

The above-described varifocal lens uses properties whereby a refractive index of liquid crystal layer is changed according to a direction in which liquid crystal molecules are aligned and includes a flat type electrode for forming lens surfaces having various shapes in a liquid crystal layer. In addition, the shapes of the lens surfaces may be minutely adjusted by using a resistance layer or a nanostructure layer.

When the above-described structure is used, a light lens may be embodied compared to a prior technology using an electrode structure having a curved shape.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A varifocal lens comprising:
   a first liquid crystal layer;
   a first electrode portion disposed below the first liquid crystal layer and having a flat shape;
   a first non-uniform electric field generator which generates a non-uniform electric field in the first liquid crystal layer together with the first electrode portion, the first non-uniform electric field generator comprising a second electrode portion having a flat shape,
   wherein the first non-uniform electric field generator further comprises a first nanostructure layer disposed between the second electrode portion and the first liquid crystal layer and,
   wherein the first nanostructure layer includes a support membrane and a plurality of nanostructures arranged on the support membrane, lengthy direction of the plurality of nanostructures being protruded from the support membrane.

2. The varifocal lens of claim 1, wherein each of the plurality of nano structures comprises any one of carbon nanotube (CNT), gold nanowire, ZnO nanowire, and Si nanowire.

3. The varifocal lens of claim 1, wherein the plurality of nano structures has a non-uniform length distribution.

4. The varifocal lens of claim 3, wherein the first electrode portion is shaped so as to face an entire lower surface of the first liquid crystal layer, and
   wherein the second electrode portion is shaped so as to face an entire upper surface of the first liquid crystal layer.

5. The varifocal lens of claim 3, wherein at least one of the first electrode portion and the second electrode portion comprises a structure in which a plurality of electrodes are spaced apart from each other and are arranged to have an overall flat structure.

6. The varifocal lens of claim 5, wherein at least one of the first electrode portion and the second electrode portion comprises a structure in which a plurality of electrodes each having a fan shape are spaced apart from each other to form a circular shape.

7. The varifocal lens of claim 1, wherein the first electrode portion is shaped so as to face an entire lower surface of the first liquid crystal layer, and
   wherein the second electrode portion is shaped such that an opening is formed in a central portion of the second electrode portion and the second electrode portion faces an edge portion of an upper surface of the first liquid crystal layer.

8. The varifocal lens of claim 7, wherein the plurality of nano structures have a uniform length distribution.

9. The varifocal lens of claim 1, wherein at least one of the first electrode portion and the second electrode portion comprises a structure in which a plurality of electrodes are spaced apart from each other and are arranged to have an overall flat structure.

10. The varifocal lens of claim 9, wherein the first electrode portion comprises a structure in which a plurality of electrodes each having a fan shape are spaced apart from each other to form a circular shape.

11. The varifocal lens of claim 10, wherein the second electrode portion comprises a structure in which a plurality of electrodes that are each shaped like a fan of which an apex portion is cut and are spaced apart from each other to form a ring shape.

12. The varifocal lens of claim 1, further comprising:
   a second liquid crystal layer disposed below the first electrode portion; and
   a second non-uniform electric field generator which generates a non-uniform electric field in the second liquid crystal layer together with the first electrode portion, the second non-uniform electric field generator comprising a third electrode portion having a flat shape,
   wherein the second non-uniform electric field generator further comprises a second nanostructure layer disposed between the second liquid crystal layer and the third electrode, the second nanostructure layer comprising a plurality of nano structures.

* * * * *